(12) United States Patent
Sevinc

(10) Patent No.: US 11,143,166 B2
(45) Date of Patent: Oct. 12, 2021

(54) ASSEMBLY FOR MEASURING DEFORMATIONS AND ROTOR BLADE INCLUDING SUCH AN ASSEMBLY

(71) Applicant: DR. JOHANNES HEIDENHAIN GmbH, Traunreut (DE)

(72) Inventor: Alper Sevinc, Hamburg (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 260 days.

(21) Appl. No.: 16/358,736

(22) Filed: Mar. 20, 2019

(65) Prior Publication Data

US 2019/0293054 A1 Sep. 26, 2019

(30) Foreign Application Priority Data

Mar. 21, 2018 (DE) ...................... 10 2018 204 349.3

(51) Int. Cl.
*F01D 17/00* (2006.01)
*F03D 17/00* (2016.01)
(Continued)

(52) U.S. Cl.
CPC ............... *F03D 17/00* (2016.05); *G01B 1/00* (2013.01); *G01B 5/30* (2013.01); *G01B 11/26* (2013.01); *G01L 5/00* (2013.01); *G01M 5/0016* (2013.01); *G01M 5/0041* (2013.01); *F05B 2260/83* (2013.01); *F05B 2270/328* (2013.01);
(Continued)

(58) Field of Classification Search
CPC .. F03D 17/00; G01B 1/10; G01B 5/30; G01B 11/26; G01L 5/00; G01M 5/0016; G01M 5/0041; F05B 2260/83; F05B 2270/328; F05B 2270/804; F05B 2270/821
See application file for complete search history.

(56) References Cited

U.S. PATENT DOCUMENTS 7,059,822 B2 1/2006 Lemieux et al.
2015/0135859 A1* 5/2015 Meyer ....................... G01L 1/04
73/862.624

FOREIGN PATENT DOCUMENTS

DE 4340030 C1 4/1995
DE 10003738 A1 8/2001
DE 102013223780 A1 5/2015

* cited by examiner

*Primary Examiner* — Woody A Lee, Jr.
*Assistant Examiner* — Maxime M Adjagbe
(74) *Attorney, Agent, or Firm* — Leydig, Voit & Mayer Ltd.

(57) ABSTRACT

An assembly includes a supporting structure and a measuring device. The measuring device includes a first flexible coupling which is torsionally stiff and non-rotatably connected to the supporting structure, a rod having a longitudinal axis and being non-rotatably connected to the first flexible coupling, and an angle-measuring device including a first component group non-rotatably connected to the rod and a second component group non-rotatably connected to the supporting structure. The first component group is disposed to be rotatable about the longitudinal axis of the rod relative to the second component group, and the angle-measuring device is configured to allow measurement of a relative angular position between the two component groups. By such an assembly, a torsion of the supporting structure about the longitudinal axis of the rod caused by mechanical loading is determinable by measuring the relative angular position between the two component groups.

12 Claims, 3 Drawing Sheets

(51) Int. Cl.
  *G01B 11/26* (2006.01)
  *G01M 5/00* (2006.01)
  *G01L 5/00* (2006.01)
  *G01B 5/30* (2006.01)
  *G01B 1/00* (2006.01)
  *G01D 5/347* (2006.01)
(52) U.S. Cl.
  CPC ..... *F05B 2270/80* (2013.01); *F05B 2270/804* (2013.01); *F05B 2270/821* (2013.01); *G01D 5/34738* (2013.01)

ASSEMBLY FOR MEASURING DEFORMATIONS AND ROTOR BLADE INCLUDING SUCH AN ASSEMBLY

CROSS-REFERENCE TO PRIOR APPLICATION

Priority is claimed to German Patent Application No. DE 10 2018 204 349.3, filed on Mar. 21, 2018, the entire disclosure of which is hereby incorporated by reference herein.

FIELD

The present invention relates to an assembly for measuring deformations of a component, such as a rotor blade of a wind turbine generator system, and to a rotor blade including such an assembly.

BACKGROUND

Rotor blades of wind turbine generator systems are subject to a variety of different forces that naturally lead to deformations, in particular torsional deformations, of the rotor blades. At any rate, it is difficult to predict the magnitude of the deformations of rotor blades of a wind turbine generator system, which is why current efforts are directed to measuring these as actual values.

With regard to predicting fatigue damage, it may be advantageous, at a desired point in time, to generate information retrospectively about an accumulated loading on the rotor blade on the basis of the measured deformations, respectively loads. Thus, the availability of such load values is significant with regard to short-term maximum loads or the expected fatigue damage. Moreover, by taking the actual deformations, respectively actual loads into consideration, it is possible to optimize the control of the wind turbine generator system, for example, by adjusting the pitch angles.

A rotor blade often has an inner supporting structure that serves to mechanically reinforce the outer skin of the rotor blade, so that the supporting structure is deformed together with the outer skin, in particular under torsional loading.

U.S. Pat. No. 7,059,822 B2 describes an assembly for measuring deformations of a rotor blade of a wind turbine generator system, in which a measuring device is mounted on a frame element in the rotor blade.

SUMMARY

In an embodiment, the present invention provides an assembly including a supporting structure and a measuring device. The measuring device includes a first flexible coupling which is torsionally stiff and non-rotatably connected to the supporting structure, a rod having a longitudinal axis and being non-rotatably connected to the first flexible coupling, and an angle-measuring device including a first component group non-rotatably connected to the rod and a second component group non-rotatably connected to the supporting structure. The first component group is disposed to be rotatable about the longitudinal axis of the rod relative to the second component group, and the angle-measuring device is configured to allow measurement of a relative angular position between the two component groups. By such an assembly, a torsion of the supporting structure about the longitudinal axis of the rod caused by mechanical loading is determinable by measuring the relative angular position between the two component groups.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
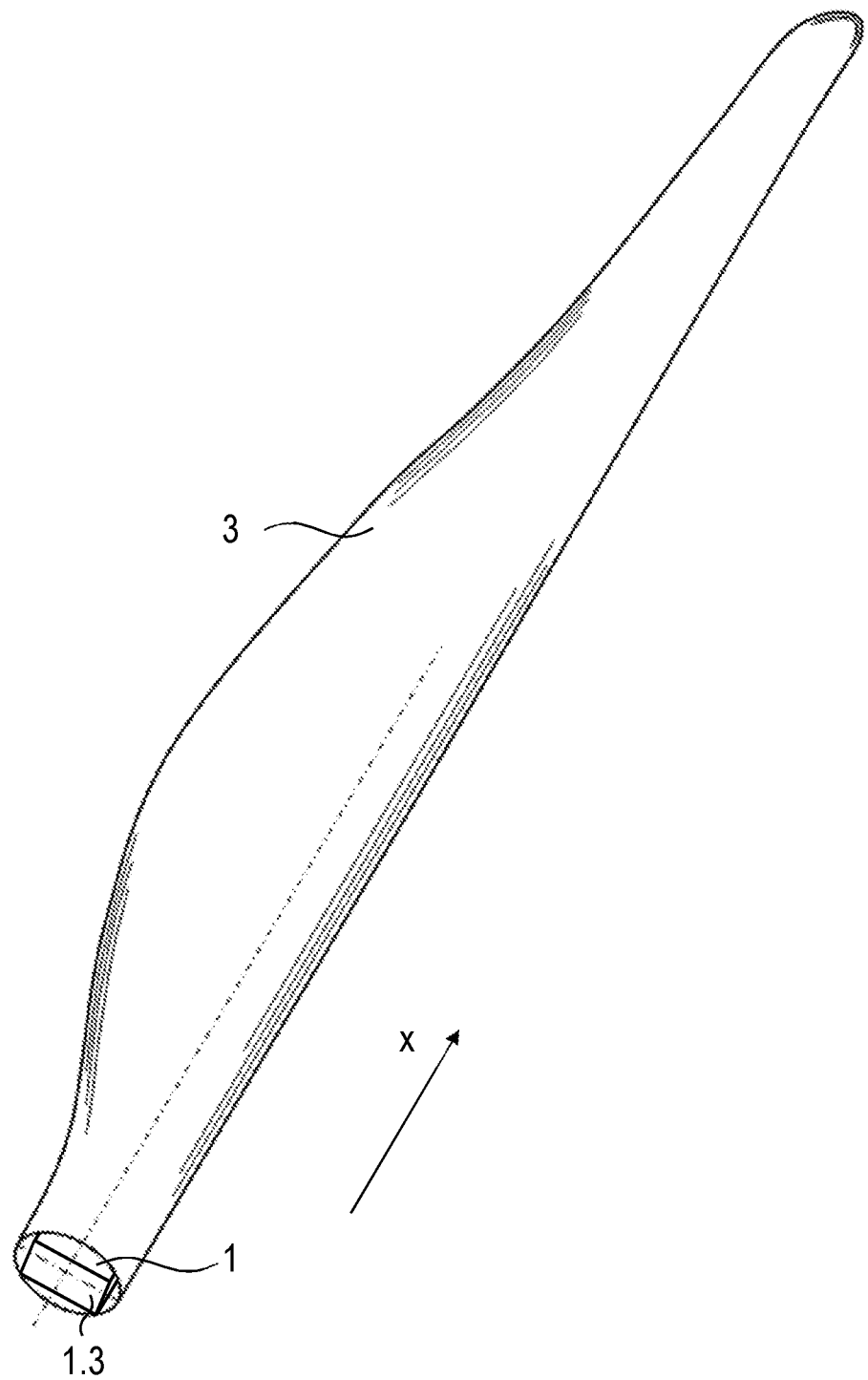
FIG. 1 is a schematic view showing a rotor blade having an assembly for measuring deformations.

In an embodiment, the present invention provides an assembly for measuring deformations of a component, such as a rotor blade of a wind turbine generator system, that is comparatively simple and operates accurately.

According to an embodiment, the assembly includes a supporting structure and a measuring device. The measuring device has a first flexible coupling, a rod, and an angle-measuring device. The first flexible coupling is torsionally stiff, and the rod has a longitudinal axis. The angle-measuring device includes a first component group and a second component group, the first component group being disposed to be rotatable about the longitudinal axis relative to the second component group. The angle-measuring device is configured to allow measurement of a relative angular position between the two component groups. The first flexible coupling is non-rotatably connected to the supporting structure, either directly or indirectly. Furthermore, the rod is non-rotatably connected to the first flexible coupling, either directly or indirectly. Moreover, the first component group is non-rotatably connected to the rod, and the second component group is non-rotatably connected to the supporting structure, so that a torsion or torsional deformation of the supporting structure about the longitudinal axis caused by mechanical loading can be determined by measuring the relative angular position between the two component groups.

In a further embodiment of the present invention, the rod is made of a material that includes plastic. The plastic may in particular be fiber-reinforced.

The second component group of the angle-measuring device advantageously includes a second flexible coupling, the second flexible coupling being non-rotatably connected to the supporting structure.

In an embodiment of the present invention, the angle-measuring device includes a measuring standard and an element for scanning the same. The measuring standard may have an annular shape and, considered geometrically, is then a hollow cylinder having circumferential curved surfaces. The curved surfaces may be of low height, so that the measuring standard is configured as an annular disk having parallel annular end faces which may also be referred to as base or top surfaces. The angular scale or angle code may be applied to one of the end faces.

Especially when the measuring standard is configured in such a way that the curved surfaces have a comparatively greater height; i.e., in the case of a rather drum-shaped measuring standard, the angular scale may be applied to the curved surface. However, the measuring standard may also be configured as a measuring tape which may be attached to the inner or outer curved surface of a cylindrical body.

In addition, the measuring standard may be configured to have a scale only over a limited angular range; i.e., may not extend over 360°, but rather have only an angular segment as a measuring range. The angular extent of the measuring standard may be matched to the maximum measurement range or angular travel.

The element for scanning the measuring standard is advantageously designed to be photosensitive or light-sensitive. Accordingly, this type of scanning is based on an optical principle.

Alternatively, the scanning may be based on an inductive or magnetic principle.

The angle-measuring device may, in particular, deliver digital position signals and/or signals that have been generated by differentiating the position signals over time, once or repeatedly. The signals in question may be transmitted purely digitally and serially, which allows for relatively simple processing of the signals, for example, for integration in a highly dynamic control.

The angle-measuring device advantageously features a measuring standard having an absolute code, so that the angle-measuring device can measure the relative angular position between the first and second component groups as an absolute value (in contrast to an incremental measurement). In this manner, the absolute deformation of the rotor blade may be measured at any desired points in time. This is particularly advantageous for inspecting the settlement processes in the rotor blade structure.

Advantageously, the assembly includes a plurality of measuring devices which, in particular, are disposed offset from each other along the longitudinal axis; i.e., arranged in line along the longitudinal axis.

Another embodiment of the present invention provides a rotor blade of a wind turbine generator system having the measuring device for measuring deformations.

Advantageously, the rod is mounted in the rotor blade such that it is oriented in the longitudinal direction thereof.

In another embodiment of the present invention, the rod has the same coefficient of thermal expansion as the rotor blade.

FIG. 1 shows a rotor blade 3 of a wind turbine generator system. In the exemplary embodiment presented here, rotor blade 3 forms part of a wind turbine generator system having a horizontal axis and, in particular, having a total of three rotor blades 3. Rotor blade 3 has a supporting structure 1, which is mounted within rotor blade 3 for mechanical stabilization and serves to stiffen rotor blade 3. Supporting structure 1 has a bulkhead 1.3 forming a boundary wall to the hub of the wind turbine generator system.

Figure 2:
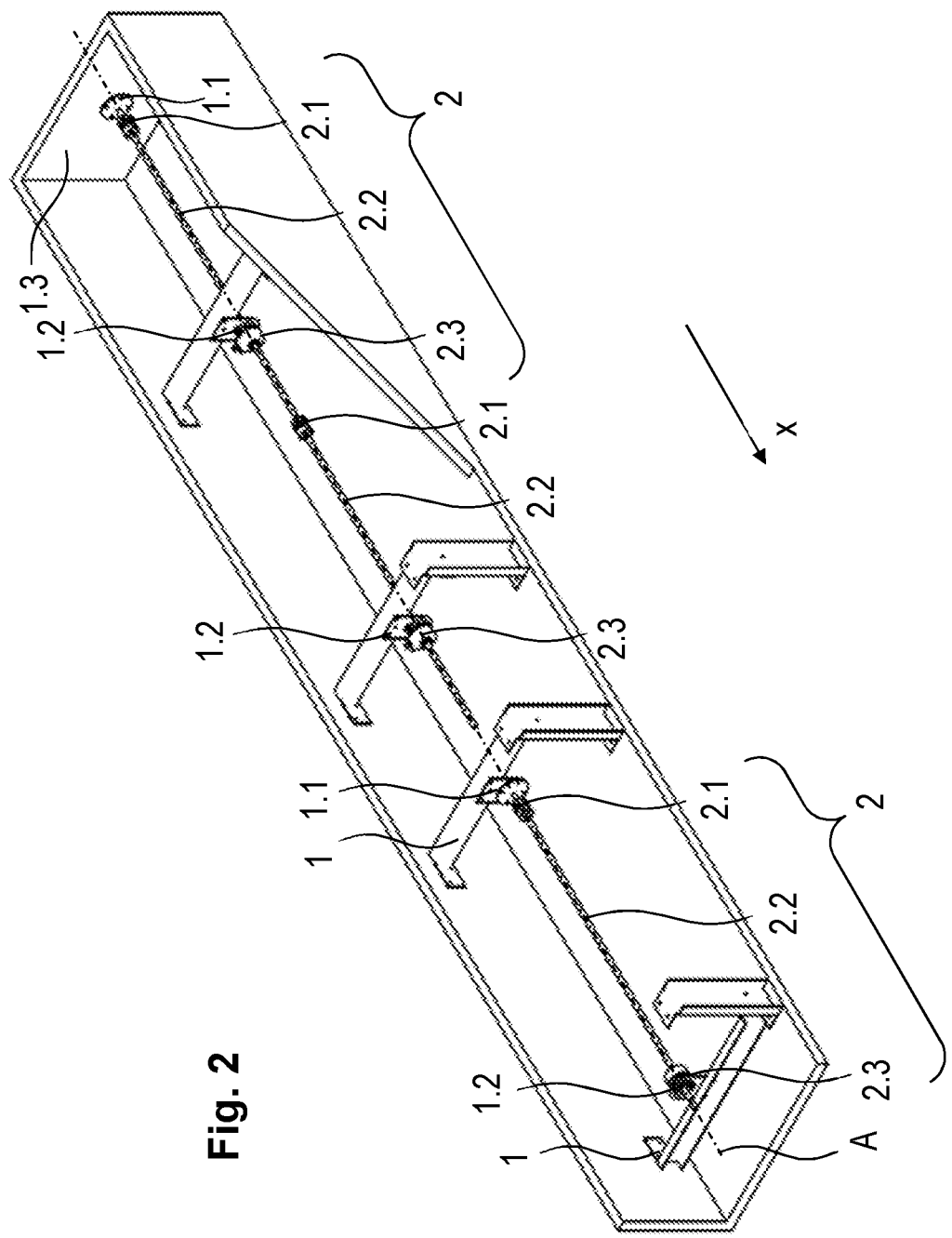
FIG. 2 is a perspective view of an assembly including a supporting structure and a measuring device for measuring deformations of a rotor blade.

A measuring device 2 for measuring deformations of rotor blade 3 is mounted in supporting structure 1 as shown in the view of FIG. 2, in which a wall of supporting structure 1 is not shown in its entirety for better illustration. To be able to draw conclusions about the deformation of rotor blade 3, it is advantageous when a plurality of such measuring devices 2 for measuring deformations are installed in supporting structure 1, as illustrated in FIG. 2. Supporting structure 1 has a first flange 1.1 and a second flange 1.2 for attachment of a respective measuring device 2.

Measuring device 2 includes a first flexible coupling 2.1, a rod 2.2 having a longitudinal axis A, and an angle-measuring device 2.3, which may also be referred to as rotary encoder.

In the exemplary embodiment presented here, first flexible coupling 2.1 is configured as a metal bellows coupling. Alternatively, a diaphragm coupling may be used here. In any case, first flexible coupling 2.1 compensates for axial movements and misalignments (radial and angular offset) between rod 2.2 and supporting structure 1, but is torsionally stiff. First flexible coupling 2.1 may be rigidly attached to first flange 1.1 of supporting structure 1.

Like rotor blade 3, rod 2.2 is made from fiberglass-reinforced plastic and has the longitudinal axis A, which is oriented in direction x parallel to the longitudinal axis of rotor blade 3. Rod 2.2 further has a first connecting point which is non-rotatably connected to first flexible coupling 2.1

Figure 3:
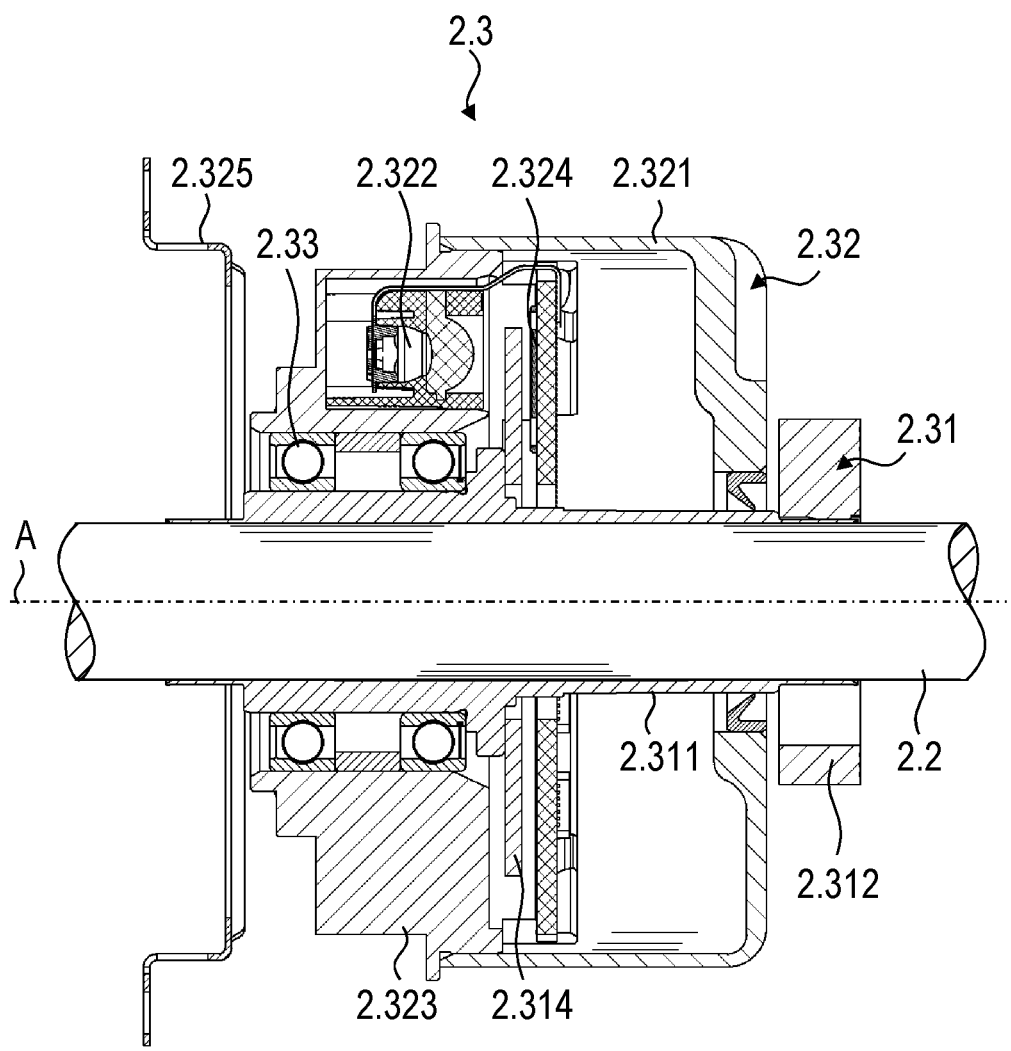
FIG. 3 is a cross-sectional view of an angle-measuring device forming part of the measuring device.

Angle-measuring device 2.3 is connected to supporting structure 1 at second flange 1.2. As illustrated in FIG. 3, the angle-measuring device 2.3 shown here includes a first component group 2.31 and a second component group 2.32. First component group 2.31 includes a shaft 2.311 which, in the exemplary embodiment presented here, is configured as a continuous hollow shaft capable of receiving rod 2.2 therein. Shaft 2.311 further has a shoulder to which a measuring standard 2.314 is joined, for example by an adhesive, permanently and only with small tolerance deviations, centrically relative to longitudinal axis A. In the exemplary embodiment presented here, measuring standard 2.314 is made of glass and has an annular shape. Inherently, it has two end faces, an angular scale being applied to one of them. The angular scale may be configured as an incremental graduation, for example, having radially oriented scale graduation marks. However, additionally or alternatively, an absolute code may also be provided.

Shaft 2.311 has provided thereon a clamping element 2.312 that non-rotatably clamps rod 2.2 to shaft 2.311, so that an angular displacement of shaft 2.311 may be generated in response to a rotational movement of rod 2.2. Clamping element 2.312 may be classified as belonging to first component group 2.31. Accordingly, rod 2.2 is connected at its second connecting point to angle-measuring device 2.3, in particular to first component group 2.31, respectively to shaft 2.311 of angle-measuring device 2.3.

In accordance with FIG. 3, shaft 2.311 is rotatably supported by two rolling element bearings 2.33 within a body 2.323, which may be classified as belonging to second component group 2.32. Also belonging to second component group 2.32 is a light source 2.322 that includes an LED and a collimator lens, for example, so that collimated light is emitted by light source 2.322. This light is transmitted through measuring standard 2.314, respectively the angular scale thereof, and is modulated in accordance with the angular position between first component group 2.31 and second component group 2.32, respectively shaft 2.311 and body 2.323. The modulated light is scanned by a scanning device 2.324 that is attached to body 2.323. Corresponding light-sensitive or photosensitive detectors are located on scanning device 2.324, which is configured as a populated circuit board. Scanning device 2.324 also includes, inter alia, electronic signal-shaping components, for example, for amplifying and digitizing the scanning signals delivered by the detectors.

Mounted around scanning device 2.324 is a housing 2.321, so that, inter alia, light source 2.322, measuring standard 2.314, and scanning device 2.324 are protected from environmental influences. A second flexible coupling 2.325 is attached to body 2.323. In the exemplary embodiment presented here, second flexible coupling 2.325 is made from sheet metal and, in particular, as a one-piece stamped and bent part. This second flexible coupling 2.325 serves for non-rotatable attachment of angle-measuring device 2.3 to second flange 1.2 of supporting structure 1. Second flexible coupling 2.325 compensates for axial movements and misalignments (radial and angular offset) between angle-measuring device 2.3 and supporting structure 1, but is torsionally stiff.

An electrical connection is established between angle-measuring device 2.3 and subsequent electronics via a connecting cable that is connected to a socket, thereby allowing electrical signals and electrical power to be transmitted between the subsequent electronics and angle-measuring device 2.3.

Thus, the relative angular position between first component group 2.31 and second component group 2.32, respectively between shaft 2.311 and rod 2.2, may be determined by angle-measuring device 2.3. Angle-measuring devices 2.3 of this kind are frequently referred to as rotary encoders.

During operation of the wind turbine generator system, rotor blades 3 are deformed by their own weight and by aerodynamic loads. In particular, loads acting on rotor blade 3 may cause torsional movements thereof about longitudinal axis A. Due to these torsional movements, supporting structure 1 is deformed, as a result of which rod 2.2 rotates relative to second flange 1.2. This rotation through a relatively small angle (in the exemplary embodiment presented here through an angle no greater than 120 minutes of arc) is detected by angle-measuring device 2.3, and corresponding signals are output. Thus, first component group 2.31 is rotated or angularly displaced relative to second component group 2.32 only within a small angular range.

As shown in FIG. 2, measuring device 2 for measuring deformations of rotor blade 3 may also be equipped with a rod 2.2 that extends through a plurality of angle-measuring devices 2.3, respectively shafts 2.311. In this variant, provision is also made for using a flexible coupling 2.1, respectively a plurality of flexible couplings 2.1.

The angle-measuring devices 2.3 arranged in line along longitudinal axis A allow rotation or torsion of rotor blade 3 to be determined for several sections.

Measuring device 2 for measuring deformations of a rotor blade 3 is naturally subject to substantial temperature fluctuations in a wind turbine generator system. Nevertheless, even under these adverse ambient conditions, exceptionally high measurement accuracies can be attained using the above-described measuring device 2 for measuring deformations. The reason for this is, on the one hand, that because angular positions are measured, the thermal expansion of measuring standard 2.314 hardly plays a role (the distances between the graduation lines and the width thereof vary with temperature, but not the angular position). On the other hand, rod 2.2 and rotor blade 3 are manufactured from the same material, so that both have the same thermal expansion properties. Finally, the pot-shaped, electrically conductive housing 2.321 makes it possible to ensure an optimal overvoltage protection, in particular for scanning device 2.324 and the associated electronics, in the case of electrical storms, for example.

The signals that may be output from angle-measuring device 2.3 are advantageously fully digital, making it possible for the subsequent electronics mentioned above to process the signals from all measuring devices 2 for measuring deformations of the rotor blades without further digitization. On the one hand, this ensures a signal transmission that is reliably protected against external disturbances. On the other hand, the signals may be processed relatively simply, making it possible for the measured deformations to be used in a closed-loop control circuit, for example for (separately) controlling the pitch angle for each rotor blade 3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An assembly comprising:
   a supporting structure; and
   a measuring device comprising:
      a first flexible coupling which is torsionally stiff and non-rotatably connected to the supporting structure,
      a rod having a longitudinal axis and being non-rotatably connected to the first flexible coupling, and
      an angle-measuring device including a first component group non-rotatably connected to the rod and a second component group non-rotatably connected to the supporting structure, the first component group being disposed to be rotatable about the longitudinal axis of the rod relative to the second component group, and the angle-measuring device being configured to allow measurement of a relative angular position between the first component group and the second component group,
   whereby a torsion of the supporting structure about the longitudinal axis of the rod caused by mechanical loading is determinable by measuring the relative angular position between the first component group and the second component group.

2. The assembly as recited in claim 1, wherein the rod is made from a material that includes plastic.

3. The assembly as recited in claim 2, wherein the plastic is fiber-reinforced.

4. The assembly as recited in claim 1, wherein the second component group of the angle-measuring device includes a second flexible coupling, the second flexible coupling being non-rotatably connected to the supporting structure.

5. The assembly as recited in claim 1, wherein the angle-measuring device includes a measuring standard and an element for scanning the measuring standard.

6. The assembly as recited in claim 5, wherein the element for scanning the measuring standard is photosensitive.

7. The assembly as recited in claim 1, wherein the assembly includes at least two of the angle-measuring device which are disposed offset from each other along the longitudinal axis of the rod.

8. A rotor blade of a wind turbine generator system having the assembly according to claim 1.

9. The rotor blade as recited in claim 8, wherein the rod is oriented in the longitudinal direction of the rotor blade.

10. The rotor blade as recited in claim 8, wherein the rod has the same coefficient of thermal expansion as the rotor blade.

11. A method of using the assembly according to claim 1, comprising:
   measuring, by the angle-measuring device, the relative angular position between the first component group and the second component group so as to determine the torsion of the supporting structure about the longitudinal axis of the rod caused by mechanical loading.

12. The assembly as recited in claim 1, wherein the first flexible coupling is torsionally stiff with respect to the longitudinal axis of the rod so as to compensate for axial movements and misalignments between the rod and the supporting structure.

* * * * *